(12) United States Patent
Jang

(10) Patent No.: US 10,407,074 B2
(45) Date of Patent: Sep. 10, 2019

(54) METHOD AND APPARATUS FOR LEARNING CLUTCH PEDAL

(71) Applicants: Hyundai Motor Company, Seoul (KR); Kia Motors Corporation, Seoul (KR)

(72) Inventor: Hwa Yong Jang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 17 days.

(21) Appl. No.: 15/831,217

(22) Filed: Dec. 4, 2017

(65) Prior Publication Data

US 2018/0162404 A1 Jun. 14, 2018

(30) Foreign Application Priority Data

Dec. 13, 2016 (KR) ........................ 10-2016-0169864

(51) Int. Cl.
*B60W 30/19* (2012.01)

(52) U.S. Cl.
CPC ..... *B60W 30/19* (2013.01); *B60W 2510/0216* (2013.01); *B60W 2510/0225* (2013.01); *B60W 2510/0638* (2013.01)

(58) Field of Classification Search
None
See application file for complete search history.

(56) References Cited

U.S. PATENT DOCUMENTS

| 4,989,471 | A | * | 2/1991 | Bulgrien | B60W 10/02 477/57 |
| 5,950,789 | A | * | 9/1999 | Hosseini | F16D 48/066 192/109 F |
| 6,023,988 | A | * | 2/2000 | McKee | F16H 61/061 477/155 |
| 6,119,072 | A | * | 9/2000 | Eastman | F16H 61/061 477/78 |
| 7,726,456 | B2 | * | 6/2010 | Ha | F16D 27/004 192/30 W |
| 8,170,761 | B2 | * | 5/2012 | Kraenzlein | F16K 37/0091 701/58 |
| 9,702,417 | B2 | * | 7/2017 | Dix | F16D 48/02 |

(Continued)

FOREIGN PATENT DOCUMENTS

JP  2016-132392 A  7/2016
KR  10-0901560 B1  6/2009
(Continued)

*Primary Examiner* — Justin Holmes
(74) *Attorney, Agent, or Firm* — Morgan, Lewis & Bockius LLP

(57) ABSTRACT

A method for learning a clutch pedal may include determining whether a clutch pedal is operated; determining at least one of a depressed speed of the clutch pedal, a depressed value of the clutch pedal, and a speed of an engine at a shifting timing when the clutch pedal is operated; determining at least one of a moving average value of the depressed speed of the clutch pedal, a moving average value of the depressed value of the clutch pedal, and a moving average of the speed of the engine for a predetermined time; and storing the moving average value as a correction value for preventing an abrasion of a shift clutch.

14 Claims, 3 Drawing Sheets

(56) References Cited

U.S. PATENT DOCUMENTS

2011/0040461 A1* 2/2011 Wolterman ........... B60W 10/02
 701/51
2015/0369364 A1* 12/2015 Vu ....................... F16H 61/688
 701/53

FOREIGN PATENT DOCUMENTS

KR 10-2016-0046631 A 4/2016
WO WO-2014177168 A1 * 11/2014 ............. F16H 61/08

* cited by examiner

METHOD AND APPARATUS FOR LEARNING CLUTCH PEDAL

CROSS-REFERENCE(S) TO RELATED APPLICATION

The present application claims priority to Korean Patent Application No. 10-2016-0169864, filed on Dec. 13, 2016, the entire contents of which is incorporated herein for all purposes by this reference.

BACKGROUND OF THE INVENTION

Field of the Invention

The present invention relates to a method and an apparatus for learning a clutch pedal, and, more particularly to a method and an apparatus for learning a clutch pedal according to tendencies of a driver.

Description of Related Art

As hybrid electric vehicle employs an internal combustion engine and a battery power source in combination. The hybrid electric vehicle efficiently combines a torque of the internal combustion engine and a torque of a motor.

Hybrid electric vehicles may be divided into a hard type and a mild type according to a power sharing ratio between the engine and the motor. In the case of the mild type of hybrid electric vehicle (hereinafter referred to as a mild hybrid electric vehicle), a mild hybrid starter & generator (MHSG), configured to start the engine or generate electricity according to an output of the engine, is utilized instead of an alternator. In the case of the hard type of hybrid electric vehicle, a driving motor configured for generating a driving torque is employed in addition to an integrated starter & generator (ISG) which is configured to start the engine or generate electricity.

The MHSG may assist the torque of the engine according to a plurality of running states of the vehicle, and may charge a battery (e.g., a 48 V battery) through regenerative braking device. Accordingly, a fuel efficiency of the mild hybrid electric vehicle may be improved.

In a case of a manual transmission applied to the mild hybrid electric vehicle, shifting is performed as a driver depresses a clutch pedal and moves a gear lever to a desired gear stage. A shift clutch of the manual transmission is engaged or released according to an operation of the clutch pedal. An operation pattern of the clutch pedal is determined according to a driving tendency of the driver. When the driver frequently engages a half-clutch state, abrasion of a shift clutch may be accelerated and the shift clutch is rapidly worn out. Accordingly, when the driving tendency of the driver is determined, the shift clutch may be controlled to coincide with the driving tendency of the driver.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method and an apparatus for learning a clutch pedal having advantages of preventing abrasion of a shift clutch.

A method for learning a clutch pedal according to an exemplary embodiment of the present invention may include: determining whether a clutch pedal is operated; determining at least one of a depressed speed of the clutch pedal, a depressed value of the clutch pedal, and a speed of an engine at a shifting timing when the clutch pedal is operated; determining at least one of a moving average value of the depressed speed of the clutch pedal, a moving average value of the depressed value of the clutch pedal, and a moving average of the speed of the engine for a predetermined time; and storing the moving average value as a correction value for preventing an abrasion of the shift clutch.

The moving average value of the depressed speed of the clutch pedal for the predetermined time may be determined by an equation of:

$$M_{SP} = \sum_{i=1}^{n}(SP_{k-n+i} \times W_i)$$

wherein $SP_k$ is a depressed speed at a current time point, $SP_{k-n+i}$ is a depressed speed at a k−n+i time point, and $W_i$ is an i-th weight value.

The moving average value of the depressed value of the clutch pedal for the predetermined time may be determined by an equation of:

$$M_{QP} = \sum_{i=1}^{n}(QP_{k-n+i} \times W_i)$$

wherein $QP_k$ is a depressed value of the clutch pedal at a current time point, $QP_{k-n+i}$ is a depressed value of the clutch pedal at a k−n+i time point, and $W_i$ is an i-th weight value.

The moving average value of the speed of the engine for the predetermined time may be determined by an equation of:

$$M_{PP} = \sum_{i=1}^{n}(PP_{k-n+i} \times W_i)$$

wherein $PP_k$ is a speed of the engine at a current time point, $PP_{k-n+i}$ is a speed of the engine at a k−n+i time point, and $W_i$ is an i-th weight value.

A sum of the n weight values may be 1 and the n weight values may satisfy a relation of $W_i = W_{i+1}$.

An apparatus for learning a clutch pedal according to an exemplary embodiment of the present invention may include: a clutch pedal position detector configured to detect a position value of the clutch pedal; an engine speed detector configured to detect a speed of an engine; a shift clutch selectively transmitting a torque of the engine to a gear train; a controller configured to determine whether the clutch pedal is operated according to a signal of the clutch pedal position detector, and controlling an operation of the shift clutch, wherein the controller is configured to determine at least one of a depressed speed of the clutch pedal, a depressed value of the clutch pedal, and the speed of the engine at a shifting timing when the clutch pedal is operated, determines at least one of a moving average value of the depressed speed of the clutch pedal, a moving average value of the depressed value of the clutch pedal, and a moving average of the speed of the engine for a predetermined time, and stores the moving average value as a correction value for preventing abrasion of the shift clutch.

The moving average value of the depressed speed of the clutch pedal for the predetermined time may be determined by an equation of:

$$M_{SP} = \sum_{i=1}^{n} (SP_{k-n+i} \times W_i)$$

wherein $SP_k$ is a depressed speed at a current time point, $SP_{k-n+i}$ is a depressed speed at a k−n+i time point, and $W_i$ is an i-th weight value.

The moving average value of the depressed value of the clutch pedal for the predetermined time may be determined by an equation of:

$$M_{QP} = \sum_{i=1}^{n} (QP_{k-n+i} \times W_i)$$

wherein $QP_k$ is a depressed value of the clutch pedal at a current time point, $QP_{k-n+i}$ is a depressed value of the clutch pedal at a k−n+i time point, and $W_i$ is an i-th weight value.

The moving average value of the speed of the engine for the predetermined time may be determined by an equation of:

$$M_{PP} = \sum_{i=1}^{n} (PP_{k-n+i} \times W_i)$$

wherein, $PP_k$ is a speed of the engine at a current time point, $PP_{k-n+i}$ is a speed of the engine at a k−n+i time point, and $W_i$ is an i-th weight value.

A sum of the n weight values may be 1, and the n weight values may satisfy a relation of $W_i = W_{i+1}$.

According to an exemplary embodiment of the present invention, the abrasion of the shift clutch may be prevented.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
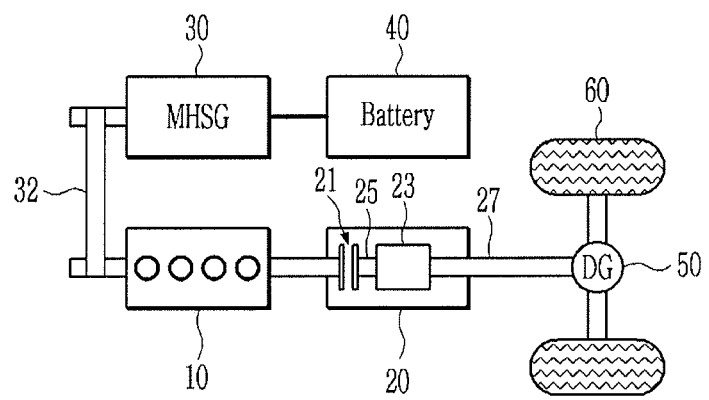
FIG. 1 is a block diagram of a mild hybrid electric vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claim.

Elements which are not related with the description are omitted for clearly describing the exemplary embodiment of the present invention, and like reference numerals refer to like or similar elements throughout the specification.

Since each component in the drawings is arbitrarily illustrated for ease of description, the present invention is not particularly limited to the components illustrated in the drawings.

FIG. 1 is a block diagram of a mild hybrid electric vehicle according to an exemplary embodiment of the present invention.

As shown in FIG. 1, a mild hybrid electric vehicle according to an exemplary embodiment of the present invention includes an engine 10, a transmission 20, a mild hybrid starter & generator (MHSG) 30, a battery 40, a differential gear apparatus 50, and wheels 60.

The engine 10 combusts fuel and air to convert chemical energy into mechanical energy. Ignition timing, an air amount, a fuel amount, and an air-fuel ratio may be controlled to generate a desired combustion torque of the engine 10.

In connection with a torque transmission of a mild hybrid electric vehicle, the torque generated from the engine 10 is transmitted to an input shaft of the transmission 20, and the torque output from an output shaft 27 of the transmission 20 is transmitted to an axle via the differential gear apparatus 50. The axle rotates the wheels 60 wherein the mild hybrid electric vehicle drives by the torque generated from the engine 10.

The transmission 20 includes a shift clutch 21 and a gear train 23 connected to the shift clutch 21 via a shaft 25. Shifting is performed as a driver depresses a clutch pedal 70 and moves a gear lever to a desired gear stage. The shift clutch 21 is interposes the engine 10 and the gear train 23, and selectively connects the engine 10 to the gear train 23. The shift clutch 21 selectively transmits the torque of engine 10 to the gear train 23. The gear train 23 changes a gear ratio according to a plurality of running states of the mild hybrid electric vehicle to perform shifting to the desired gear stage.

The MHSG 30 is configured to convert electrical energy into mechanical energy or converts mechanical energy into electrical energy. The MHSG 30 starts the engine 10 or generates electricity according to an output of the engine 10. In addition, the MHSG 30 may assist the torque of the engine 10. The torque of the engine 10 may be used as a main torque, and the torque of the MHSG 30 may be used as an auxiliary torque. The engine 10 and the MHSG 30 may be connected to each other through a belt 32.

The battery 40 may supply electricity to the MHSG 30, and may be charged through electricity recovered by the MHSG 30. The battery 40 may be a 48 V battery. The mild hybrid electric vehicle may further include a low voltage battery DC-DC converter (LDC) configured to convert a voltage supplied from the battery 40 into a low voltage, and a low voltage battery (e.g., a 12 V battery) supplying a low voltage to a plurality of electrical loads (e.g., a head lamp and an air conditioner).

Figure 2:
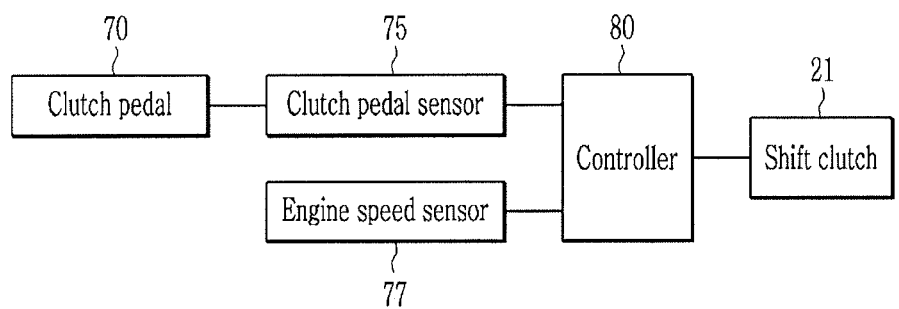
FIG. 2 is a block diagram illustrating an apparatus for learning a clutch pedal according to an exemplary embodiment of the present invention.

FIG. 2 illustrates is an apparatus for learning a clutch pedal according to an exemplary embodiment of the present invention.

As shown in FIG. 2, an apparatus for learning a clutch pedal according to an exemplary embodiment of the present invention may include a clutch pedal 70, a clutch pedal position detector 75, an engine speed detector 77, a controller 80, and the shift clutch 21.

A depressed value of the clutch pedal 70 is adjusted according to a driver's operation.

The clutch pedal position detector 75 is configured to detect a position value of the clutch pedal 70 (i.e., depressed value of the clutch pedal 70), and transmits a corresponding signal to the controller 80. When the clutch pedal 70 is completely depressed, the position value of the clutch pedal 70 is considered 100%, and when the clutch pedal 70 is not depressed, the position value of the clutch pedal 70 is considered 0%.

The engine speed detector 77 is configured to detect a speed of the engine 10, and transmits a corresponding signal to the controller 80. The engine speed detector 77 may be configured to detect the speed of the engine 10 from a phase change of a crankshaft.

The controller 80 is configured to control an operation of the shift clutch 21 according to the signals of the clutch pedal position detector 75. When the position value of the clutch pedal 70 is equal to or greater than a predetermined position value (e.g., 60%), the controller 80 may be configured to release the shift clutch 21.

The controller 80 may be implemented with one or more processors executed by a predetermined program, and the predetermined program may include a series of commands for performing each step included in a method for learning a clutch pedal according to an exemplary embodiment of the present invention to be described below.

The shift clutch 21 selectively transmits the torque of the engine 10 to the gear train 23. The shift clutch 21 according to an exemplary embodiment of the present invention is an electronic clutch. The shift clutch 21 is not engaged or released according to the position value of the clutch pedal 70 as it is, but is engaged or released by control of the controller 80. When the driver frequently and unnecessarily depresses the clutch pedal 70 (e.g., a half-clutch state), the controller 80 may be configured to maintain the shift clutch 21 in an engaged state to prevent abrasion of the shift clutch 21.

Figure 3:
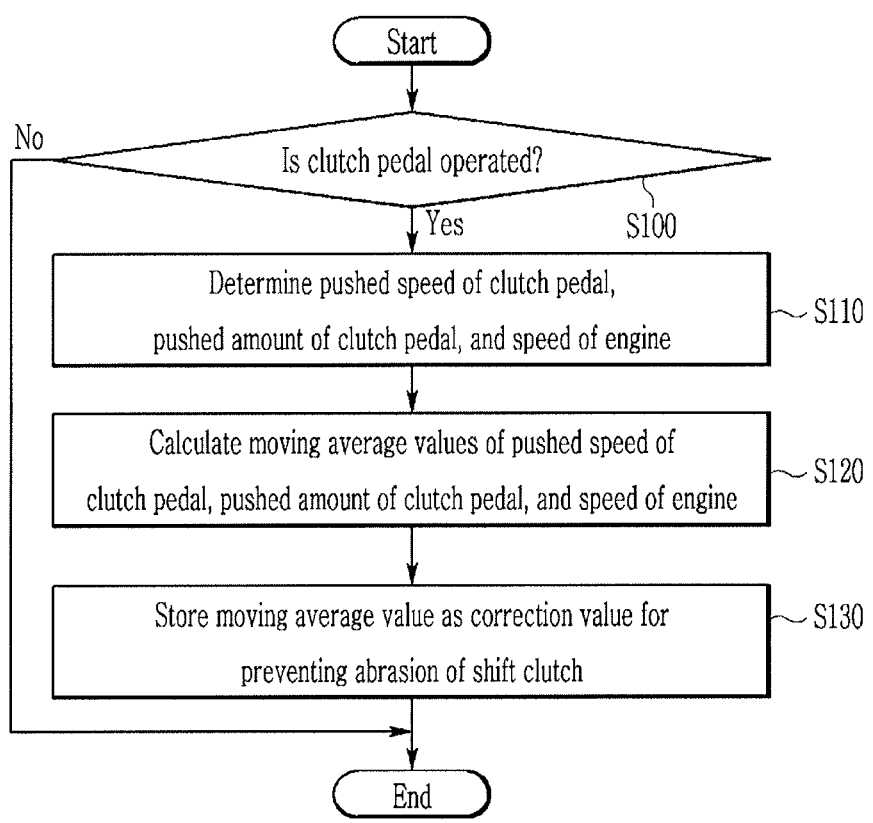
FIG. 3 is a flowchart illustrating a method for learning a clutch pedal according to an exemplary embodiment of the present invention.

FIG. 3 is a flowchart illustrating a method for learning a clutch pedal according to an exemplary embodiment of the present invention.

As shown in FIG. 3, the controller 80 is configured to determine whether the clutch pedal 70 is operated according to the signal of the clutch pedal position detector 75 (S100).

When the clutch pedal 70 is not operated (S100), the controller 80 is configured to end the method for learning the clutch pedal 70 according to an exemplary embodiment of the present invention.

When the clutch pedal 70 is operated (S100), the controller 80 is configured to determine at least one of a depressed speed of the clutch pedal 70, a depressed value of the clutch pedal 70 at a shifting timing, and a speed of the engine 10 at the shifting timing (S110).

The controller 80 may be configured to determine a depressed speed of the clutch pedal 70 (speed of press; SP) according to the signal of the clutch pedal position detector 75. In detail, the controller 80 may be configured to determine the depressed speed of the clutch pedal 70 according to the position value of the clutch pedal 70 per unit time. In a case that the depressed speed of the clutch pedal 70 is slow, when the clutch pedal 70 is engaged or released according to the position value of the clutch pedal 70 as it is, the shift clutch 21 may be easily abraded.

The controller 80 is configured to determine the depressed value of the clutch pedal 70 (quantity of press; QSP) at the shifting timing based on the signal of the clutch pedal position detector 75. In detail, the controller 80 may be configured to determine the depressed value of the clutch pedal according to the position value of the clutch pedal 70 at a time point at which the driver moves the gear lever to the desired gear stage.

The controller 80 may be configured to determine the speed of the engine 10 (point of press; PP) at the shifting timing according to the signal of the engine speed detector 77. In detail, the controller 80 may be configured to determine the speed of the engine 10 at a time point at which the driver moves the gear lever to the desired gear stage.

The controller 80 may be configured to determine at least one of a moving average value $M_{SP}$ of the depressed speed of the clutch pedal 70 for a predetermined time, a moving average value $M_{QP}$ of the depressed value of the clutch pedal 70 for the predetermined time, and a moving average value $M_{PP}$ of the speed of the engine 10 for the predetermined time (S120).

The controller 80 may be configured to determine the moving average $M_{SP}$ of the depressed speed of the clutch pedal 70 for the predetermined time according to n depressed speeds of the clutch pedal 70 and n weight values for the predetermined time. The moving average value $M_{SP}$ of the depressed speed of the clutch pedal 70 may be determined by the following Equation 1.

$$M_{SP} = \sum_{i=1}^{n} (SP_{k-n+i} \times W_i) \quad \text{[Equation 1]}$$

In the above Equation 1, $SP_k$ is the depressed speed of the clutch pedal 70 at a current time point (k time point), $SP_{k-n+i}$ is the depressed speed of the clutch pedal 70 at a k−n+i time point, and $W_1$ is an i-th weight value. A sum of the n weight values $W_1$ to $W_n$ is 1, and an i-th weight value may be equal to or less than an (i+1)-th weight value (i.e., $W_i \leq W_{i+1}$). The (i+1)-th weight value is determined to be equal to or greater than the i-th weight value, and thus the most recent depressed speed of the clutch pedal 70 has the greatest effect on the moving average value $M_{SP}$.

The controller 80 may be configured to determine the moving average $M_{QP}$ of the depressed value of the clutch pedal 70 for the predetermined time according to n depressed values of the clutch pedal 70 and n weight values for the predetermined time. The moving average value $M_{QP}$ of the depressed speed of the clutch pedal 70 may be determined by the following Equation 2.

$$M_{QP} = \sum_{i=1}^{n} (QP_{k-n+i} \times W_i) \quad \text{[Equation 2]}$$

In the above Equation 2, $QP_k$ is the depressed value of the clutch pedal 70 at a current time point (k time point), $QP_{k-n+i}$ is the depressed value of the clutch pedal 70 at a k−n+i time point, and $W_i$ is an i-th weight value. A sum of the n weight values $W_1$ to $W_n$ is 1, and an i-th weight value may be equal to or less than an (i+1)-th weight value (i.e., $W_i \leq W_{i+1}$). The (i+1)-th weight value is determined to be equal to or greater than the i-th weight value, and thus the most recent depressed value of the clutch pedal 70 has the greatest effect on the moving average value $M_{QP}$.

The controller 80 may be configured to determine the moving average $M_{PP}$ of the speed of the engine 10 for the predetermined time according to n speeds of the engine 10 and n weight values for the predetermined time. The moving average value $M_{PP}$ of the speed of the engine 10 may be determined by the following Equation 3.

$$M_{PP} = \sum_{i=1}^{n} (PP_{k-n+i} \times W_i) \quad \text{[Equation 3]}$$

In the above Equation 3, $PP_k$ is the speed of the engine 10 at a current time point (k time point), $PP_{k-n+i}$ is the speed of the engine 10 at a k−n+i time point, and $W_i$ is an i-th weight value. A sum of the n weight values $W_1$ to $W_n$ is 1, and an i-th weight value may be equal to or less than an (i+1)-th weight value (i.e., $W_i \leq W_{i+1}$). The (i+1)-th weight value is determined to be equal to or greater than the i-th weight value, and thus the most recent speed of the engine 10 has the greatest effect on the moving average value $M_{PP}$.

The controller 80 is configured to store the moving average value $M_{SP}$ of the depressed speed of the clutch pedal 70 for the predetermined time, the moving average value $M_{QP}$ of the depressed value of the clutch pedal 70 for the predetermined time, and the moving average value $M_{PP}$ of the speed of the engine 10 for the predetermined time as a correction value for preventing abrasion of the shift clutch 21. The controller 80 may prevent abrasion of the shift clutch 21 using the correction value. For example, when the driver frequently and unnecessarily depresses the clutch pedal 70, the controller 80 may be configured to maintain the shift clutch 21 in the engagement state to prevent abrasion of the shift clutch 21. In addition, when the driver does not depress the clutch pedal 70 deeply in shifting, the controller 80 may be configured to completely release the shift clutch 21 by determining that the clutch pedal 70 is not deeply depressed.

As described above, according to an exemplary embodiment of the present invention, abrasion of the shift clutch 21 may be prevented.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. IT is intended that the scope of the invention be defined by the Claims appended hereto and their equivalents.

What is claimed is:

1. A method for learning a clutch pedal comprising:
   determining, by a controller, whether the clutch pedal is operated;
   determining, by the controller, at least one of a depressed speed of the clutch pedal, a depressed value of the clutch pedal, and a speed of an engine at a shifting timing when the clutch pedal is operated;
   determining, by the controller, at least one of an average value of the depressed speed of the clutch pedal, an average value of the depressed level of the clutch pedal, and an average value of the speed of the engine for a predetermined time period; and
   storing, by the controller, the average values as a correction value for preventing an abrasion of a shift clutch.

2. The method of claim 1, wherein the average value of the depressed speed of the clutch pedal for the predetermined time period is determined by an equation of:

$$M_{SP} = \sum_{i=1}^{n} (SP_{k-n+i} \times W_i),$$

wherein $SP_k$ is a depressed speed at a current time point, $SP_{k-n+i}$ is a depressed speed at a k−n+i time point, and $W_i$ is an i-th weight value.

3. The method of claim 1, wherein the average value of the depressed value of the clutch pedal for the predetermined time period is determined by an equation of:

$$M_{QP} = \sum_{i=1}^{n} (QP_{k-n+i} \times W_i),$$

wherein $QP_k$ is a depressed value of the clutch pedal at a current time point, $QP_{k-n+i}$ is a depressed value of the clutch pedal at a k−n+i time point, and $W_i$ is an i-th weight value.

4. The method of claim 1, wherein the average value of the speed of the engine for the predetermined time period is determined by an equation of $$M_{PP} = \sum_{i=1}^{n} (PP_{k-n+i} \times W_i),$$

wherein $PP_k$ is a speed of the engine at a current time point, $PP_{k-n+i}$ is a speed of the engine at a k−n+i time point, and $W_i$ is an i-th weight value.

5. The method of claim 2, wherein a sum of n weight values is 1 and the n weight values satisfy a relation of $W_i = W_{i+1}$.

6. The method of claim 3, wherein a sum of n weight values is 1 and the n weight values satisfy a relation of $W_i W_{i+1}$.

7. The method of claim 4, wherein a sum of n weight values is 1 and the n weight values satisfy a relation of $W_i = W_{i+1}$.

8. An apparatus for learning a clutch pedal comprising:
a clutch pedal position detector configured to detect a position value of the clutch pedal;
an engine speed detector configured to detect a speed of an engine;
a shift clutch selectively transmitting a torque of the engine to a gear train;
a controller configured to determine whether the clutch pedal is operated according to a signal of the clutch pedal position detector, and configured to control an operation of the shift clutch,
wherein the controller is configured to determine at least one of a depressed speed of the clutch pedal, a depressed value of the clutch pedal, and the speed of the engine at a shifting timing when the clutch pedal is operated,
to determine at least one of an average value of the depressed speed of the clutch pedal, an average value of the depressed value of the clutch pedal, and an average value of the speed of the engine for a predetermined time period, and
to store the average values as a correction value for preventing an abrasion of the shift clutch.

9. The apparatus of claim 8, wherein the average value of the depressed speed of the clutch pedal for the predetermined time period is determined by an equation of:

$$M_{SP} = \sum_{i=1}^{n} (SP_{k-n+i} \times W_i),$$

wherein $SP_k$ is a depressed speed at a current time point, $SP_{k-n+i}$ is a depressed speed at a k−n+i time point, and $W_i$ is an i-th weight value.

10. The apparatus of claim 8, wherein the average value of the depressed value of the clutch pedal for the predetermined time period is determined by an equation of:

$$M_{QP} = \sum_{i=1}^{n} (QP_{k-n+i} \times W_i),$$

wherein $QP_k$ is a depressed value of the clutch pedal at a current time point, $QP_{k-n+i}$ is a depressed value of the clutch pedal at a k−n+i time point, and $W_i$ is an i-th weight value.

11. The method of claim 8, wherein the average value of the speed of the engine for the predetermined time period is determined by an equation of:

$$M_{PP} = \sum_{i=1}^{n} (PP_{k-n+i} \times W_i),$$

wherein, $PP_k$ is a speed of the engine at a current time point, $PP_{k-n+i}$ is a speed of the engine at a k−n+i time point, and $W_i$ is an i-th weight value.

12. The apparatus of claim 9, wherein a sum of n weight values is 1 and the n values satisfy a relation of $W_i = W_{i+1}$.

13. The apparatus of claim 10, wherein a sum of n weight values is 1 and the n weight values satisfy a relation of $W_i = W_{i+1}$.

14. The apparatus of claim 11, wherein a sum of n weight values is 1 and the n weight values satisfy a relation of $W_i = W_{i+1}$.

* * * * *